United States Patent [19]

Yamada

[11] Patent Number: 5,801,465
[45] Date of Patent: Sep. 1, 1998

[54] UNDERWATER MOTOR WITH WATER-PROOF CONNECTOR

[75] Inventor: Yoshiyuki Yamada, Kanagawa-ken, Japan

[73] Assignee: Ebara Corporation, Tokyo, Japan

[21] Appl. No.: 675,086

[22] Filed: Jul. 13, 1996

[51] Int. Cl.[6] .................................................. H02K 11/00
[52] U.S. Cl. .......................... 310/71; 310/87; 174/77 R; 439/271
[58] Field of Search ............................ 439/935, 271; 310/71, 87; 174/77 R

[56] References Cited

U.S. PATENT DOCUMENTS

| | | | |
|---|---|---|---|
| 3,665,509 | 5/1972 | Elkins | 439/271 |
| 4,167,300 | 9/1979 | Fischer et al. | 439/271 |
| 4,674,807 | 6/1987 | Boteler et al. | 439/106 |
| 4,767,356 | 8/1988 | Grappe | 439/455 |
| 5,011,432 | 4/1991 | Sucht et al. | 439/584 |
| 5,113,101 | 5/1992 | Liu et al. | 310/87 |
| 5,595,496 | 1/1997 | Konda et al. | 439/271 |

FOREIGN PATENT DOCUMENTS

| | | |
|---|---|---|
| 1-146273 | 6/1989 | Japan. |
| 2-109281 | 4/1990 | Japan. |
| 2-50987 | 4/1990 | Japan. |
| 2-59583 | 5/1990 | Japan. |
| 6-203890 | 7/1994 | Japan. |

OTHER PUBLICATIONS

"New generation of submersible motor pumps", WORLD PUMPS, Oct. 1995, p. 12.

*Primary Examiner*—Steven L. Stephan
*Assistant Examiner*—Tran N Nguyen
*Attorney, Agent, or Firm*—Wenderoth, Lind & Ponack, L.L.P.

[57] ABSTRACT

An underwater motor according to the present invention includes a motor body and a cable for connecting the motor body to a power source for sending and receiving electrical signals with respect to the motor body. Both the cable and the motor body are provided with connectors for removably connecting the motor body and the cable to each other. In this way, an underwater motor, in which installation, transportation and wiring operations easily can be performed and which can prevent penetration of water, is provided.

12 Claims, 9 Drawing Sheets

UNDERWATER MOTOR WITH WATER-PROOF CONNECTOR

BACKGROUND OF THE INVENTION

1. Field of the Invention

The present invention relates to a dry underwater motor, and more particularly, to an underwater motor in which connection of a cable is effected by a water-proof connector.

2. Prior Art

In underwater motors, a secure structure for preventing water from entering into a motor at a position where a power cable or a control cable is introduced into the motor is required. In the past, the following structures have been adopted:

(1) a structure in which a distal end of the cable is fixed and sealed by a rubber packing or resin; or (2) a structure in which a distal end of the cable is molded in an elastic material such as rubber, with fixing and sealing being effected at that portion.

Figure 8:
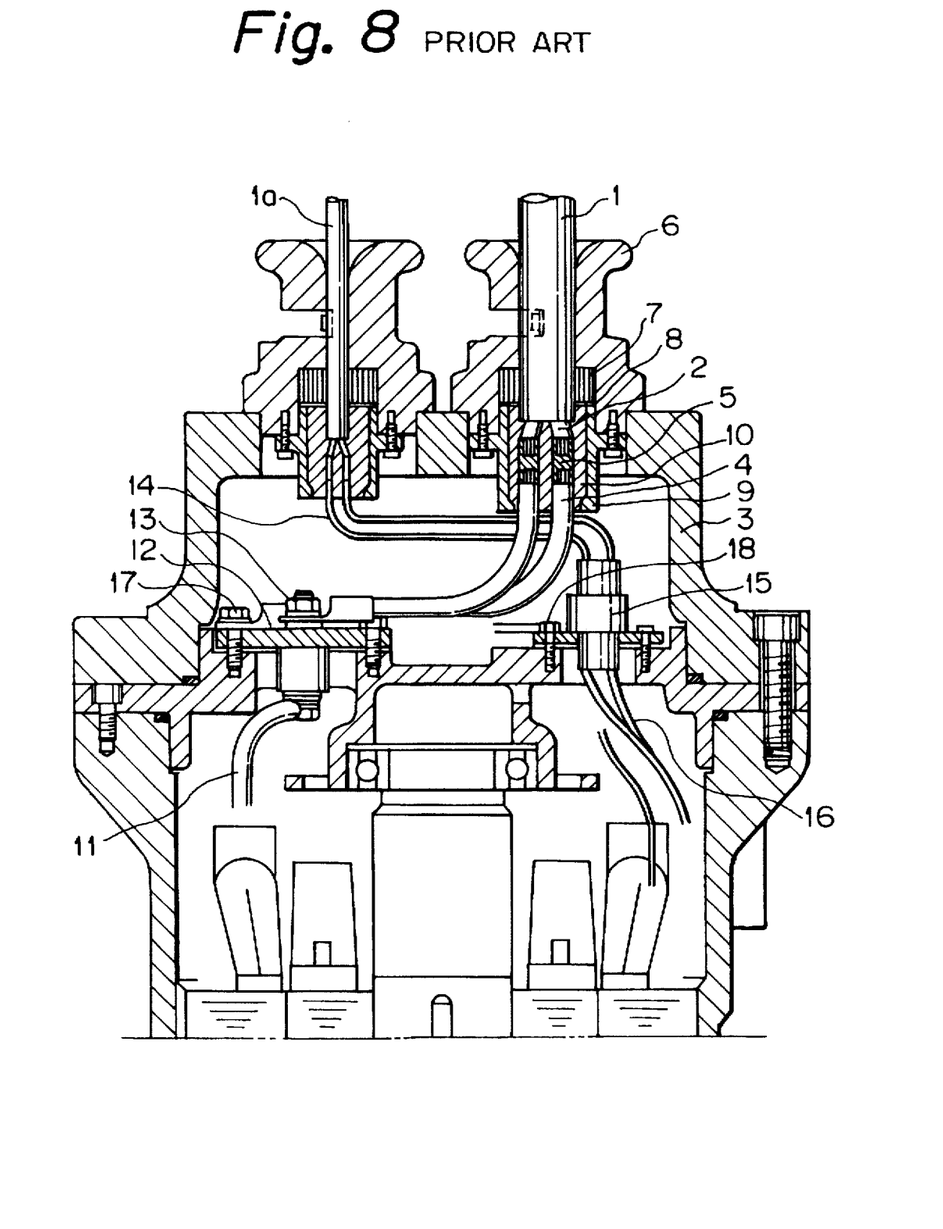
FIG. 8 is a sectional view showing the construction of upper cable introduction portions of a conventional underwater motor.

FIG. 8 shows an example of the above structure (1), and particularly shows a structure of a cable connecting portion in detail. A procedure for connecting a power source and the like to a motor by using such a structure will now be explained.

Firstly, core wires 2 of a power cable 1 are connected to core wires 4 of the motor by using compression sleeves 5, and, at the same time, a water preventing treatment is made. Then, the connected portion is inserted into a housing 6 so that a rubber packing 7 is compressed by a washer 8 and a gland 9, thereby fixing and sealing the cable. After the core wires 4 are positioned, resin 10 is poured into the gland 9. When the resin is cured, the operation is complete.

After the resin 10 has been completely cured, the cable introduction portion is attached to a motor cover 3. The motor cover is suspended and the core wires 4 are secured to an end of a terminal on a terminal plate 12 by a nut 13. The other end of the terminal is connected to a motor lead wire 11. Also, core wires 14 of a control cable 1a are connected to control lead wires 16 through an exclusive connector 15. Further, an earth wire is grounded by utilizing a terminal plate fixing bolt 17 and a connector flange fixing bolt 18. Lastly, the motor cover 3 is lowered, and the motor cover is secured to a motor body by bolts.

However, in the above-mentioned conventional technique, since the distal end of the cable is connected to the motor lead wire within the motor, the following problems arise:

(1) In the case of a high output motor, since the power cable 1 is thick and the distal end of the cable is connected to the lead wire 11 in a narrow space within the motor, operability deteriorates.

(2) When the underwater motor is transported, since the cables 1, 1a are long (normally, 10 m or more), the cables roll and such rolled cables must be attached to the motor.

(3) When the underwater motor is installed, since the cables 1, 1a are connected to the motor, the cables may become disconnected accidentally.

Figure 9:
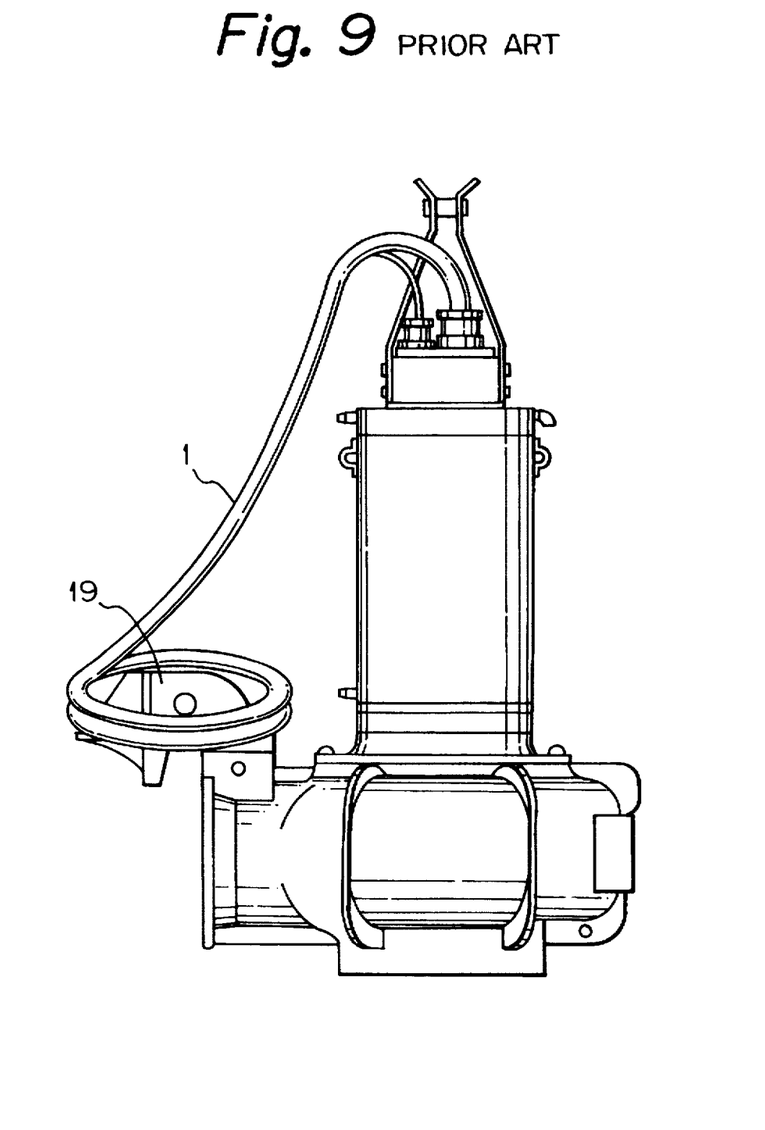
FIG. 9 is a view showing a pump using the conventional underwater motor during transportation.

(4) When periodic inspection or maintenance of the underwater motor pump is effected on the spot, since the power cable is disconnected from a control board, and, as shown in FIG. 9, a pump with the long and thick cable connected thereto must be brought to the inspection location, operability deteriorates. The cable 1 is rolled and is attached to a sliding guide 19 at a pump discharge portion.

Further, since the interior of the underwater motor is pneumatically communicated with the atmosphere through the conductor of the cable 1, there is a danger of moisture entering the motor. To avoid this, a portion of the conductor of the cable 1 must be pneumatically shielded (moisture removing treatment).

Further, in the case of multi-core cables, one of the cores must be grounded to the motor body to form earth. Thus, when the cable 1 is thick, it is difficult to effect operability wiring a ground connection.

SUMMARY OF THE INVENTION

The present invention aims to eliminate the above-mentioned conventional drawbacks, and an object of the present invention is to provide an underwater motor in which installation, transportation and wiring can be easily performed and water is prevented from entering into the motor.

To achieve the above object, according to the present invention, there is provided equipment or an underwater motor features as follows.

The underwater motor of the present invention comprises a motor body, and a cable for connecting the motor body to a power source or for sending and receiving an electrical signal with respect to the motor body. Both the motor body and the cable are provided with connectors for removably connecting the motor body and the cable to each other. With this arrangement, a cable introduction portion of the underwater motor can be assembled as a connector unit, thereby facilitating assembly and transportation. Further, before installation of the underwater motor is completed or immediately after inspection, since the cable can be easily connected to or disconnected from the motor body, operability is improved and the cable can be prevented from being damaged.

The present invention further provides an underwater motor wherein the connectors comprise outer cover members which can be removably and liquid-tightly connected to each other with respective opening portions facing each other, and being provided with insulation members for closing the opening portions, and contact members which are liquid-tightly attached to the insulation members and engaged with each other to provide an electrical connection. The outer cover members are normally made of metal, but may be made of a non-conductive material such as plastic or rubber. The outer cover member of the connector of the cable is normally formed in a cylindrical shape, and the outer cover member of the connector of the motor body may be the motor body itself. With this arrangement, the interior of the motor is liquid-tightly sealed from an outer environment by double shields or seals, thereby preventing water from entering into the interior of the motor.

The present invention still further provides an underwater motor wherein the outer cover members have cylindrical walls fitted to each other. By fitting the cylindrical walls to each other, connection and disconnection between the connectors easily can be effected, and a positive seal arrangement can be easily obtained.

Further, the present invention provides an underwater motor wherein the outer cover member of the connector of the motor body is constituted from an intermediate member different from the motor body, and the intermediate member is liquid-tightly attached to the motor body. By constituting an outer cover member of the connector of the motor body from a member separate from the motor body, for example, when cylindrical walls are formed, the degree of freedom is increased in comparison with direct working or machining of the motor body, and workability can be improved.

The present invention further provides an underwater motor wherein at least one of the outer cover members is provided with a flange portion for interconnecting the outer cover members to each other, and the flange portion is provided at its periphery with fastening portions for receiving fasteners therethrough, the number of fastening portions being different from the number of contact members. For example, in the case where the number of contact members is four (four terminals), when three fastening portions are provided, if the fastening portions are situated in an improper position, the contact members are not engaged by each other, thereby preventing erroneous electrical connection.

The present invention still further provides an underwater motor wherein the fasteners comprise bolts and the fastening portions comprise bolt fixing holes.

Further, the present invention provides an underwater motor wherein the flange portion of the outer cover member of the connector of the cable has a triangular outer configuration. By arranging a plurality of outer cover members in a radial direction so that one apex of each triangle is directed toward a center of the motor body, it is possible to connect a number of connectors in a small space.

Furthermore, the present invention provides an underwater motor wherein, in the connector of the cable, exposed portions of core wires and/or connector terminals are shielded to prevent water or moisture from entering the interior of the motor through the cable.

The present invention further provides an underwater motor wherein the outer cover members are conductive, and, in the connector of the cable, a ground terminal is connected to the outer cover member. As a result, a grounding operation in a narrow space within the motor is not required.

The present invention still further provides an underwater motor wherein, when the connectors approach each other, the outer cover members contact each other more rapidly than the contact between the contact members. By this arrangement, when the connectors are connected or disconnected relative to each other, since the ground terminal is previously effected, electric shock can be prevented.

The present invention also provides an underwater motor wherein either of the connectors is provided with an air passage communicating with a closed space between the connectors defined after the connectors are connected to each other. With this arrangement, by supplying high pressure air into the closed space through the air passage, it can be determined whether the liquid-tight seal is properly effected or not.

In addition, the present invention provides an underwater motor wherein the air passage is formed in the outer cover member of the motor body. Further, the present invention provides an underwater motor further comprising a connector for removably connecting a power supply cable or a motor control cable to the motor body.

The present invention further provides a water-proof connector having connector members for removably connecting an equipment body to a cable for connecting the equipment body to a power source or for sending and receiving an electrical signal with respect to the equipment body, and wherein the connector members comprise outer cover members which can be removably and liquid-tightly connected to each other to fit respective cylindrical walls with each other, insulation members for closing opening portions of the outer cover members, and contact members liquid-tightly attached to the insulation members and adapted to be engaged by each other to provide electrical connection.

Further, the present invention provides a water-proof connector wherein the outer cover member of the cable is provided with a fixing flange portion having a triangular outer configuration.

The present invention also provides a water-proof connector wherein, in the connector member of the cable, exposed portions of core wires and/or connector terminals are shielded to prevent penetration of water.

The present invention further provides a water-proof connector wherein the outer cover members are conductive, and, in the connector member of the cable, an earth terminal is previously connected to the outer cover member.

The present invention still further provides a water-proof connector wherein, when the connector members are approached to each other, the outer cover members are contacted with each other before the contact members are contacted with each other.

Lastly, the present invention provides a water-proof connector wherein either of the connector members is provided with an air passage communicating with a closed space between the connector members defined after the connector members are connected to each other.

DETAILED DESCRIPTION OF PREFERRED EMBODIMENTS

Figure 1:
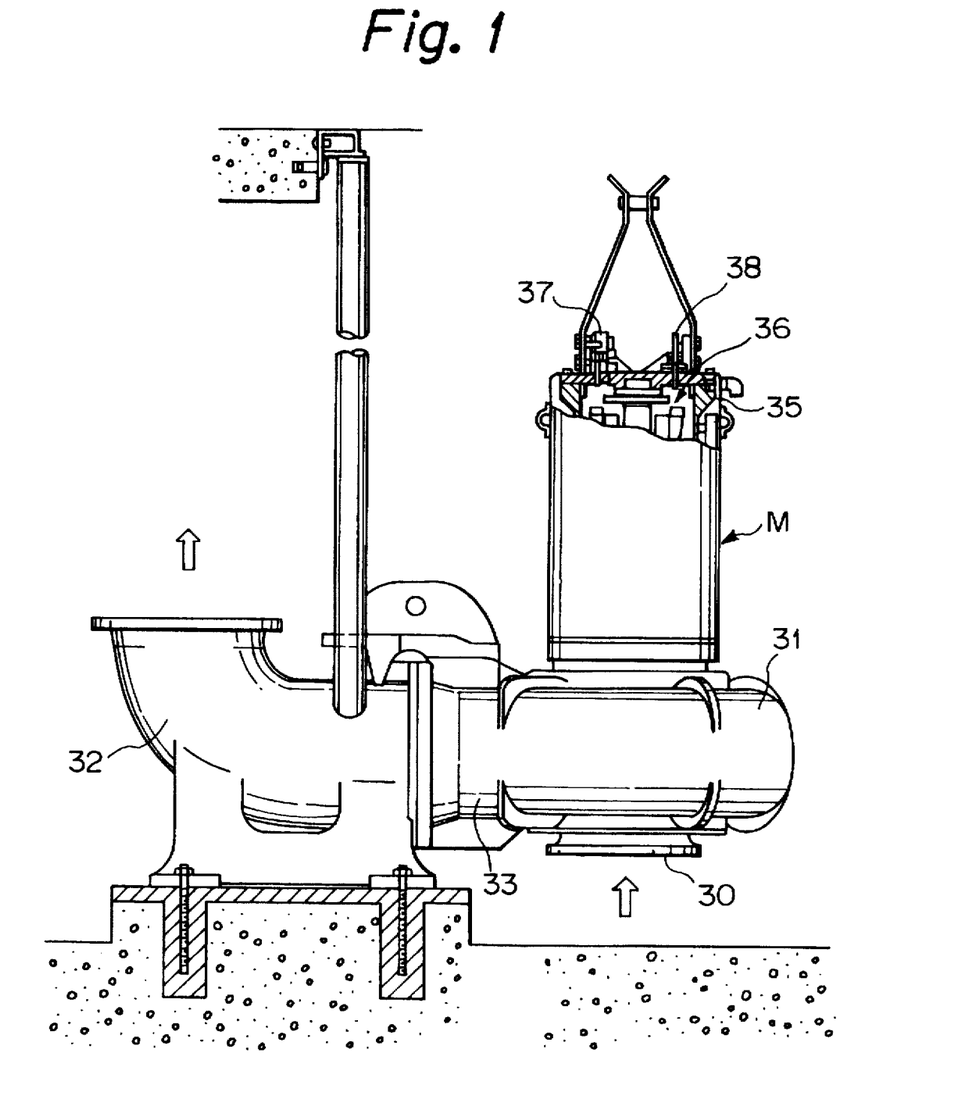
FIG. 1 is a schematic illustration showing the entire construction of a pump system using an underwater motor according to the present invention.

FIG. 1 shows an underwater pump of a vertical shaft type using an underwater motor according to the present invention. In the pump, a vane wheel is disposed within a pump housing 33 having a suction opening 30, a volute chamber 31 and a discharge piping 32, and an underwater motor M is attached to an upper portion of the pump housing 33. The underwater motor M comprises a cylindrical motor casing 35, and a motor body 36 incorporated into the motor casing, and connector structures for removably connecting a power cable 37 and a control cable 38 to the motor body are formed on an upper surface of the motor casing 35.

Figure 2:
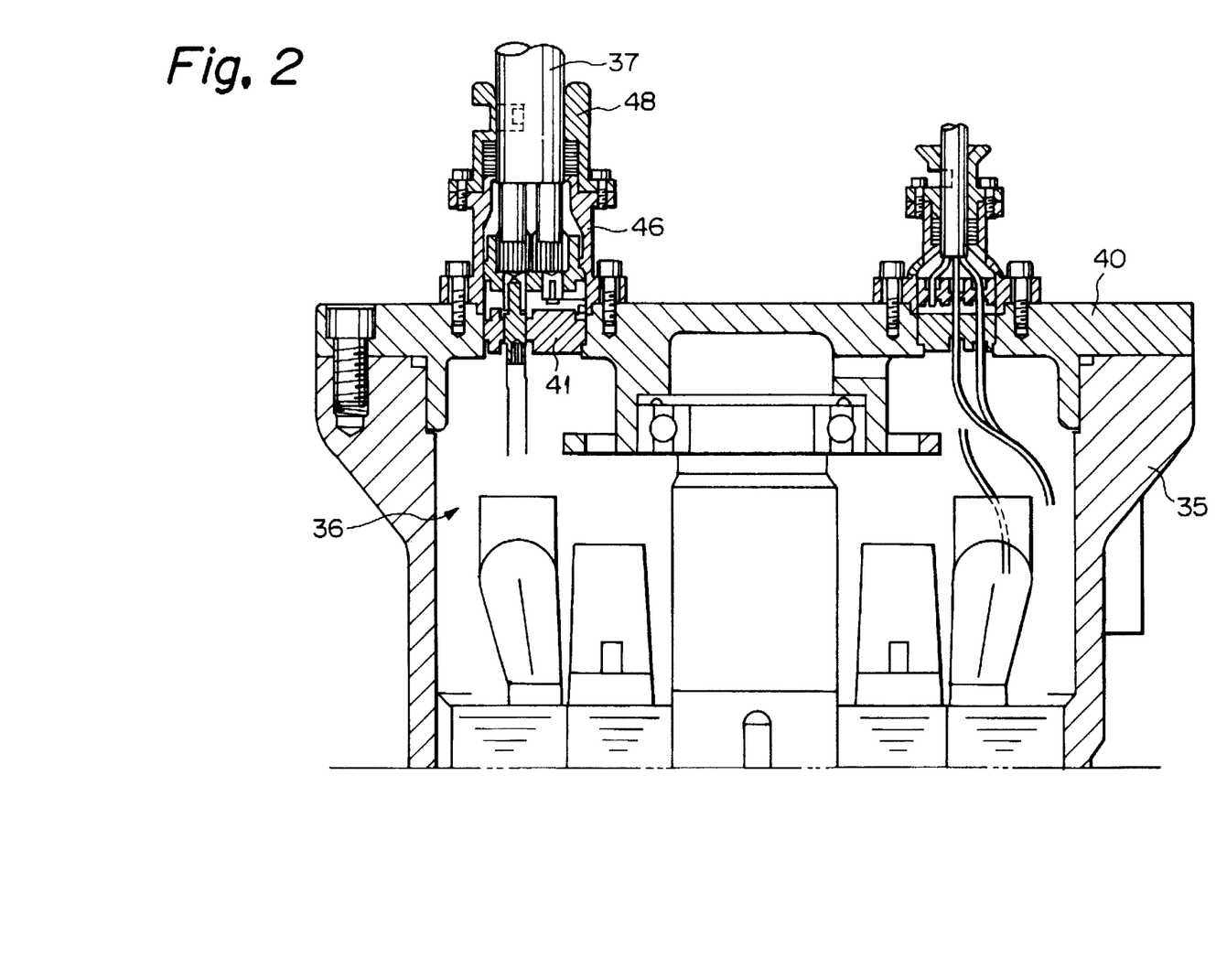
FIG. 2 is a sectional view showing the construction of upper cable insertion openings of the underwater motor according to the present invention.
Figure 3:
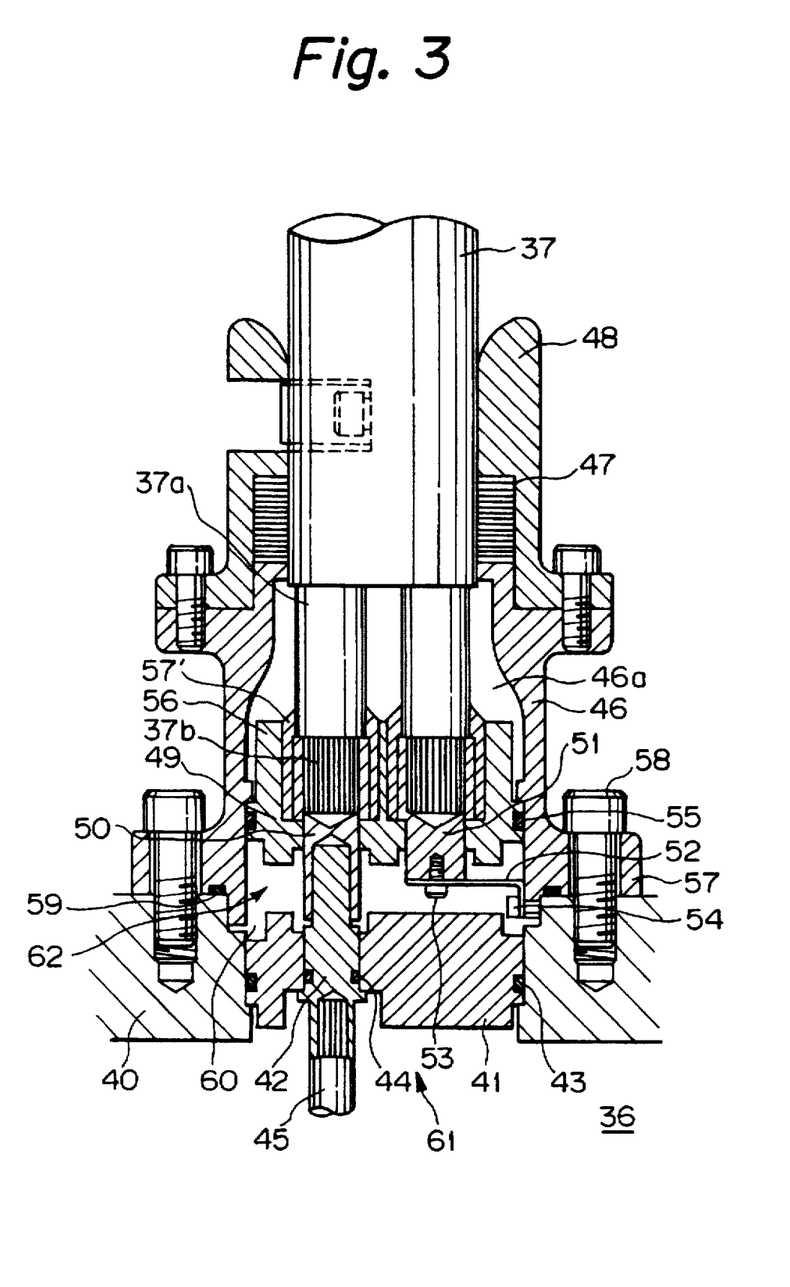
FIG. 3 is a sectional view showing the construction of a power cable insertion opening of the underwater motor according to the present invention.
Figure 4:
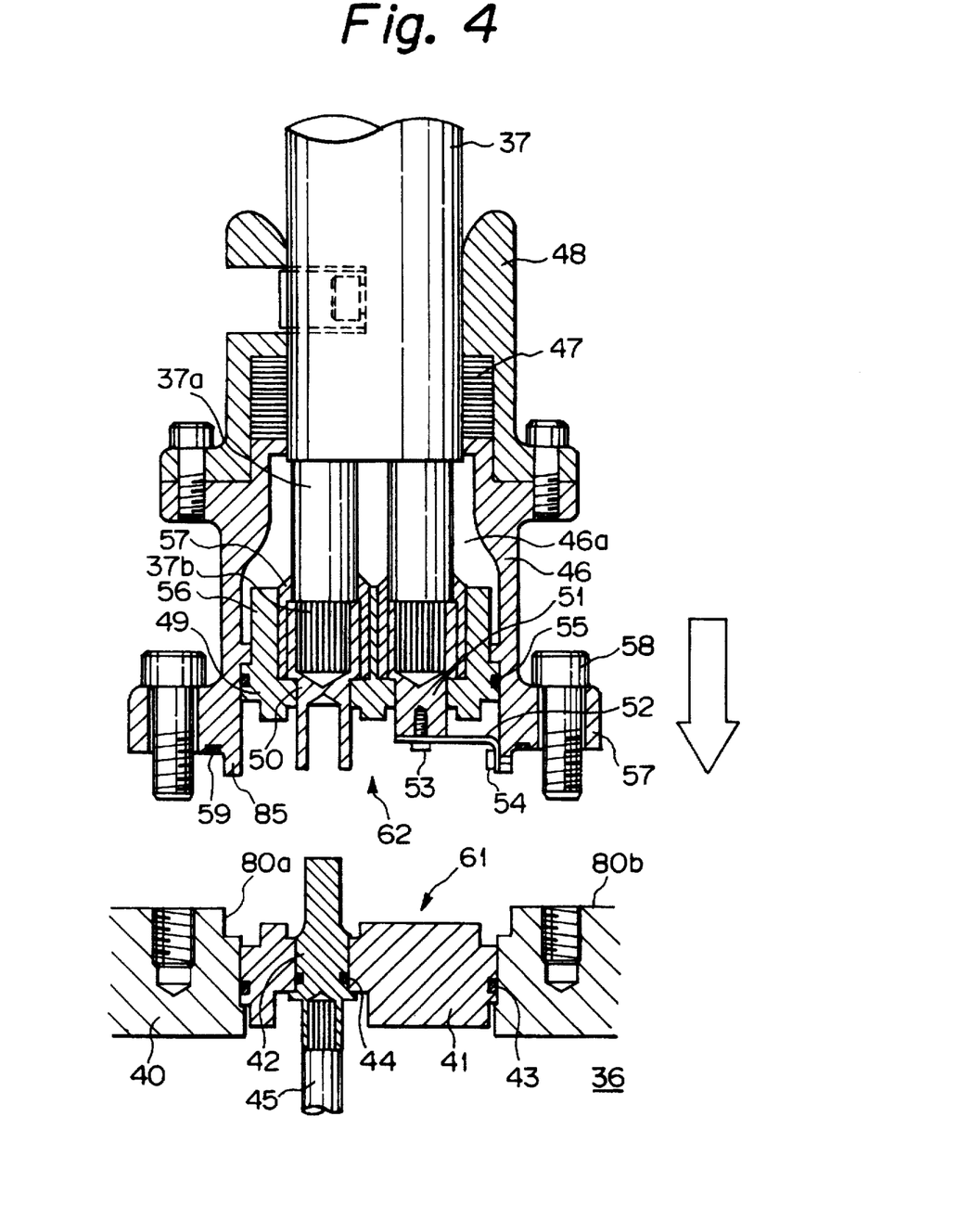
FIG. 4 is a sectional view of the underwater motor according to the present invention, showing a condition that a connector of a power cable is being connected to the motor.

As shown in FIGS. 2 to 4, in the motor body 36, an insulation member 41 is attached to an opening portion of a top plate 40 of the casing 35, and a male contact 42 is protruded outwardly from the insulation member 41. A cylindrical recess 80a is formed in the top plate 40 concentrically with insulation member 41. O-rings 43, 44 are disposed between the top plate 40 and the insulation member 41 and between the insulation member 41 and the contact 42, respectively, to ensure liquid-tight seals. A lead wire 45 from the motor is connected to an inner end of the contact 42.

On the other hand, a cylindrical connector body 46 is mounted on the end of the power cable 37, and a cable gland 48 is secured to the connector body via a rubber packing 47 by bolts. A disk plate-shaped insulation member 49 having openings is attached to an lower end portion of the connector body 46. The lower end portion of the connector body 46 has a cylindrical portion 85. A female contact 50 is mounted in one of the openings of the insulation member 49 and an earth contact 51 is mounted in the other opening. Core wires 37a of the cable 37 are connected to upper (inner) ends of the contacts 50, 51. An earth plate 52 is secured to a lower (outer) end of the earth contact 51 by a bolt 53, and the earth plate is also secured to an inner surface (formed from conductive material such as metal) of the connector body 46 by a bolt 54.

An O-ring 55 is disposed between the connector body 46 and the insulation member 49, thereby ensuring liquid-tight sealing of a space 46a within the connector body 46 and a space 60 of the connector connecting portion. Further, a wall 56 extending along the female contact 50 is formed on an inner surface of the insulation member 49, and resin 57' is loaded in a clearance between the wall 56 and the contact 50 to enclose the contact 50 and exposed portions 37b of the core wires 37a, and the resin is cured. With this arrangement, an air-tight seal and liquid-tight between the exposed portions 37b of the core wires 37a and the space 46a can be ensured. A flange 57 is formed on a lower end of the connector body 46, which flange is attached to the top plate 40 of the casing by bolts 58 with flange 57 resting on support surface 80b. An O-ring 59 is mounted on an lower surface of the flange to ensure a liquid-tight seal of the space 60 of the connector connection portion.

A motor connector 61 is constituted by the top plate 40 of the motor body 36, the cylindrical recess 80a formed in the top plate, the insulation member 41 and the contact 42, and a cable connector 62 is constituted by the connector body 46, the cylindrical portion 85, the insulation member 49 and contacts 50, 51.

Now, a process for effecting connection of the above-mentioned connector structure will be explained. First of all, the male contact 42 to which the lead wire 45 was connected is attached to the insulation member 41 of the motor body, thereby securing the male contact to the motor body 36. On the other hand, the female contact 50 and the earth contact 51 to which the core wires 37a of the power cable 37 were connected, respectively are attached to the insulation member 49, and the resin 57' is poured within the wall 56 of the insulation member. By curing the resin, the contacts are secured to the connector body 46. The earth plate 52 is attached to the earth contact 51 by the bolt 53 and is grounded to the connector body 46 via the bolt 54. The above-mentioned operations can be performed at any convenient place such as a factory other than the motor installation location.

Then, as shown in FIG. 4, by connecting the contacts 50, 42 to each other, the power cable 37 is electrically connected to the lead wire 45. The control cable is connected similarly. Since these connecting operations are normally performed after the underwater pump is installed, the installation operation is facilitated in comparison with an installation operation of a long cable, and the cables are not damaged.

By providing that the axially total length of the cylindrical portion 85 and the cylindrical recess to be longer than the axially total length of male contact 42 and female contact 50, the earth circuit can be formed before the power circuit is formed when the first and second connectors are connected. When the first and second connectors are separated from each other, the earth circuit can be switched off after the power circuit is switched off.

In the underwater motor M having the above-mentioned construction, in spite of the fact that the connector structure is used, an adequate liquid-tight seal is ensured. That is to say, the O-rings 43, 44 seal between the internal space of the motor body 36 and the connecting portion space 60, and the O-ring 55 and the rubber packing 47 seal between the connecting portion space 60 and the external space. Accordingly, the internal space of the motor body 36 is liquid-tightly sealed with respect to the external space in a double seal fashion, thereby preventing liquid from entering into the motor body 36.

Further, since the ends of the core wires 37a are sealed by the resin 57 and the connection between the power cable and the motor body 36 is effected through the contacts 42, 50, moisture is prevented from entering into the connecting portion space 60 and the internal space of the motor body 36 through the core wires 37a. If water enters into the interior of the connector structure through around the cable packing 47, the water is merely trapped within the space 46a of the connector body 46, and there is no short-circuit between the core wire ends 37b. Further, if the connectors are disconnected from each other in the water, since the O-rings 43, 44 seal between the internal space of the motor body 36 and the connecting portion space 60, the water cannot enter into the motor body 36.

Figure 5:
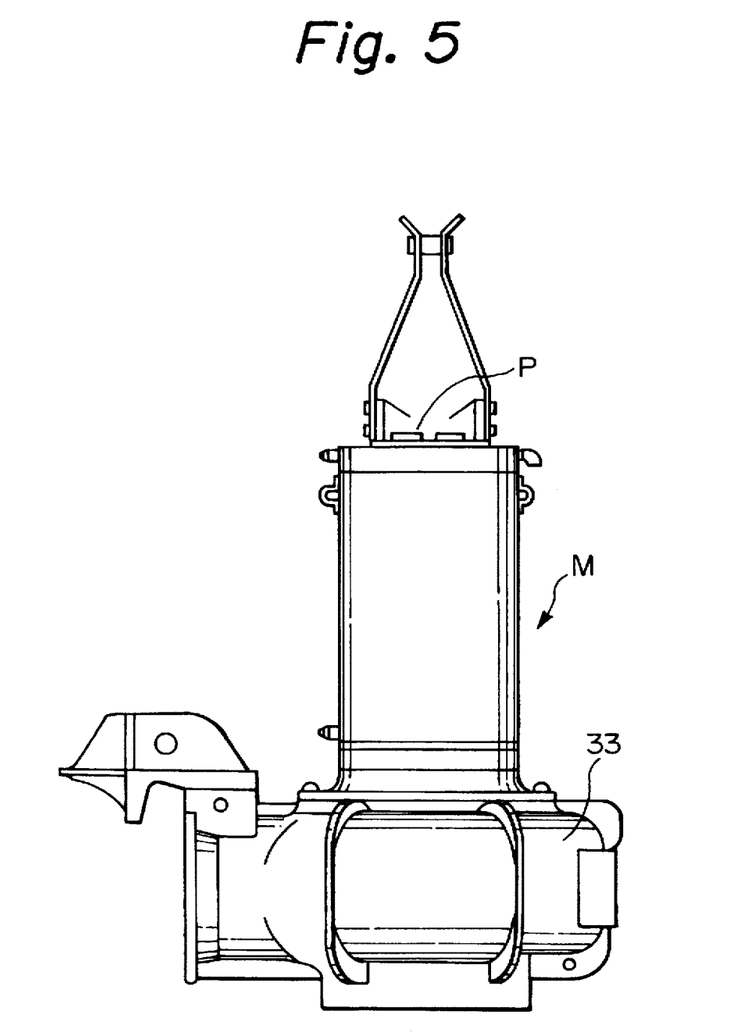
FIG. 5 is a view showing a pump using the underwater motor according to the present invention during transportation.

When the underwater motor M is transported for periodical inspection or maintenance, as shown in FIG. 5, the cable 37 is disconnected, and a closure plate P is attached to protect the male contact 42. As a result, transportation is easier than with a motor having a long cable. Further, damage to the cable can be prevented.

In the illustrated embodiment, since the earth plate 52 is attached to the earth contact 51 by the bolt 53 and the earth plate is grounded to the connector body 46 via the bolt 53, grounding is completed merely by attaching the connector body 46 to the top plate 40 of the motor casing. Thus, the provision of the earth in the interior of the motor is not required, thereby further simplifying the connecting operation.

Figure 6:
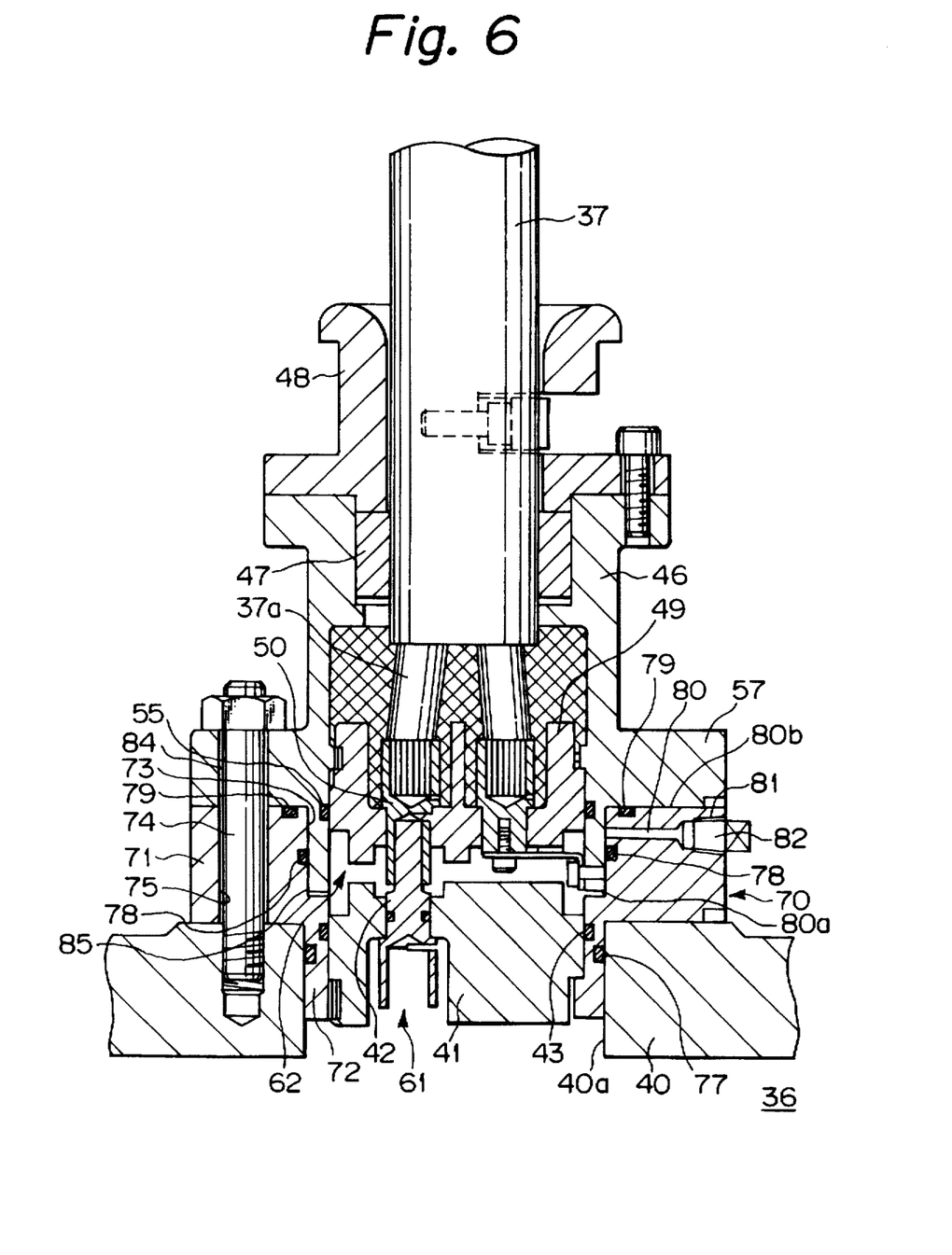
FIG. 6 is a sectional view showing another embodiment of a pump system using an underwater motor according to the present invention.
Figure 7A:
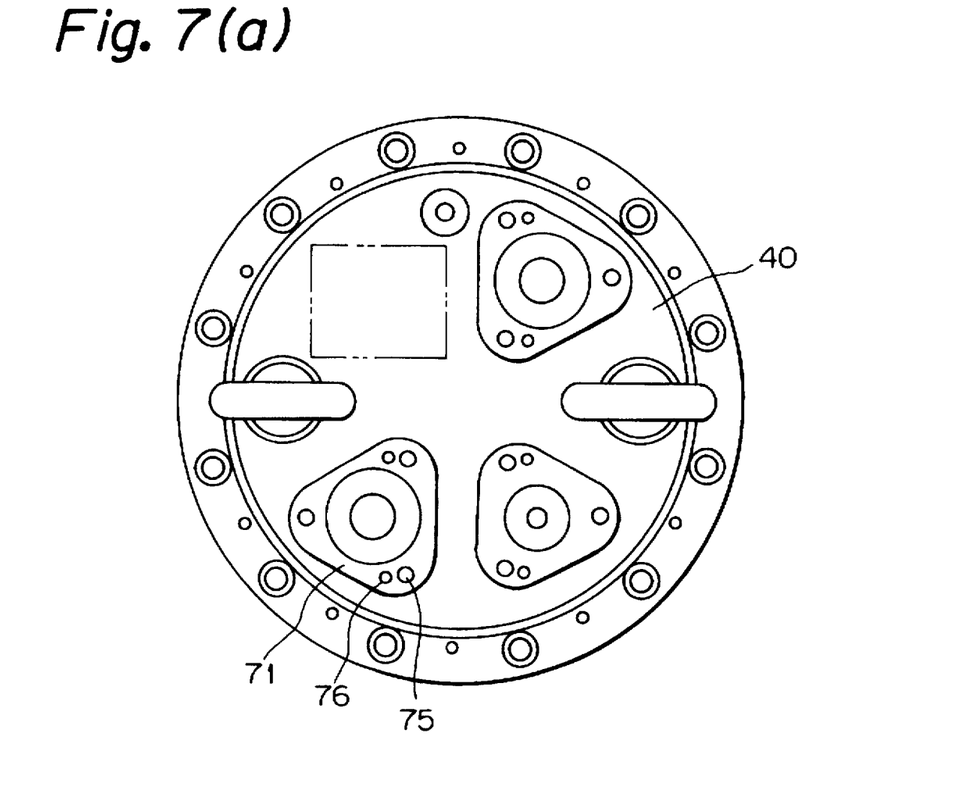
FIG. 7(a) is a plan view of the pump system of FIG. 6.
Figure 7B:
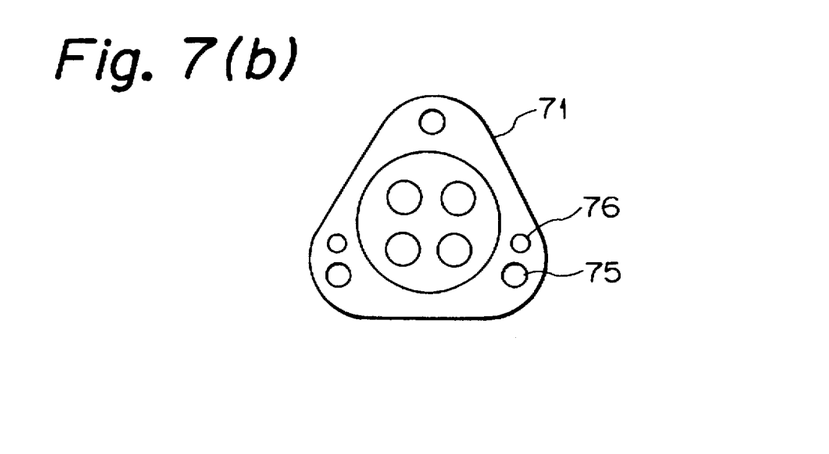
FIG. 7(b) is an enlarged view showing a portion of FIG. 7(a).

FIGS. 6 and 7 show a second embodiment of the present invention. In an underwater motor according to this embodiment, an outwardly protruding socket member (intermediate member) 70 is attached to a connector portion of the underwater motor, and, the connector body of the cable is connected to the motor body 36 through the socket member 70. The socket member 70 is constituted by an upper triangular flat plate-shaped flange portion 71 and a socket cylindrical portion 72 protruded downward from a lower surface of the flange portion 71.

The flange portion 71 is provided with a central receiver hole 73 for receiving the connector body 46, and bolt holes 75 for receiving connector fixing bolts 74 are formed in three apex portions of the triangle of the flange. Further, the flange portion 71 has bolt holes 76 for securing the socket member 70 to the top plate 40 of the motor casing, which bolt holes 76 are disposed offset from the apex portions. The socket member 70 is secured to the upper surface of the top plate 40 by bolts with the socket cylindrical portion 72 inserted into an opening 40a of the top plate 40. Further, an insulation connector substrate 41 to which a predetermined number of male contacts 42 are attached is mounted within the cylindrical portion 72 via an O-ring 43.

An O-ring 77 is disposed around the cylindrical portion 72 of the socket member 70 to ensure a liquid-tight seal between the socket member 70 and the opening 40a. Further, O-rings 78, 79 are disposed on an inner peripheral surface and an upper surface of the flange portion 71 of the socket member 70, respectively, to ensure a liquid-tight seal between the socket member 70 and the connector body 46. The flange portion 70 is further provided with an air passage 80 extending between the inner and outer peripheral surfaces of the flange, and a threaded portion 81 for connecting a high pressure air piping to the air passage is formed in an outer end of the air passage. The threaded portion 81 is normally closed by a threaded plug 82. An inner end of the air passage 80 is open between the two O-rings 78 and 79 of the socket member 70.

The connector body 46 includes a flange portion 57 having a triangular shape corresponding to the socket member 70, and bolt holes 84 are formed in the apex portions of the flange. The connector body 46 is provided at its lower surface with a cylindrical portion 85 fitted into the socket member 70, and a lower end of the cylindrical portion 85 is protruded downwardly below a lower end of the female contact 50 of the connector body 46.

A positional relation between the lower end of the cylindrical portion 85 of the connector body 46 and the lower end of the female contact 50 and a positional relation between the upper surface of the flange portion 71 and the upper end of the male contact 42 are selected so that, when the connector body 46 is attached to the socket member 70, the cylindrical portion 85 is contacted with the flange portion 71 before the female contact 50 is contacted with the male contact 42, thereby firstly grounding the earth contact. When the connector body is dismounted from the socket member, the cylindrical portion 85 is disconnected from the flange portion 71 after the female contact 50 is disconnected from the male contact 42.

In this underwater motor M, a power cable and a control cable are connected to the top plate 40 of the motor casing 35 by using the above-mentioned connector structure. As mentioned above, since the flange portion 57 of the connector body 46 has a triangular shape, by orienting one apex toward a center of the top plate, the narrow area of the circular top plate 40 of the motor casing can be effectively utilized to attach the connector body to the top plate.

Although three bolts are used to secure the connector, four core wires in the cable is normally used, and, the corresponding contacts 50, 42 are arranged in a square fashion as shown in FIG. 7(b). Accordingly, if the connector body 46 is not correctly attached to the socket member 70, the contacts 50 cannot be fitted onto the contacts 42, thereby preventing erroneous connection.

Further, since the flange portions 57, 71 having bolt holes their apex portions are connected to each other, the proper connection position can be obtained by three positioning operations at the most. In addition, since positioning can be performed without using any dowels or marks, the positioning operation for connection can be facilitated.

After the positioning operation is performed in this way, the O-rings are arranged at desired positions and then the connectors are interconnected by tightening the bolts. Then, the threaded plug 82 is removed and a high pressure air source is connected to the air passage 80 so that a check may be conducted of whether or not a liquid-tight seal is ensured. If there is any leakage, gauge pressure is maintained at a low value or it takes a long time to reach the maximum pressure corresponding to the pressure of the high pressure air source. On the contrary, if there if no leakage, the gauge pressure immediately reaches the maximum pressure. In this way, in the underwater motor M according to this embodiment, the connecting operation for the connectors can be performed easily and safely on the spot and erroneous connection can be avoided.

Incidentally, the application of the water-proof connector according to the present invention is not limited to an underwater motor, but, the water-proof connector can be employed with any electric or electronic equipments (for example, a power supplying portion of underwater working craft or power/control cable connecting portions of a vehicle) which may be used in the water or at the water's edge, with the same technical advantages.

EFFECT OF THE INVENTION

The present invention provides the following advantages superior to conventional structures for fixing and sealing a distal end of a cable by using a rubber packing and/or resin or by molding such a distal end with elastic material such as rubber:

(1) Since it is not required that the distal end of the cable is not connected to the lead wire in the narrow space within the motor, operability is greatly improved.

(2) Since a motor cover and terminal support can be omitted, the structure can be simplified.

(3) Since a long thick cable is not connected to the underwater motor during transportation of the latter, packaging of the motor easily can be performed.

(4) Since the cable can be connected to the underwater motor after the motor has been installed, damage to the cable during installation can be prevented.

(5) During periodic inspection or maintenance of the underwater motor, by disconnecting the connectors from each other (and not disconnecting from the power control board), since the pump body alone can be transported to an inspection place, operability can be improved.

(6) If the cable is damaged, since the damaged cable alone may be replaced by a new one without disassembling the motor body, such repair can be easily performed.

(7) Since moisture entering into the motor through spaces between the conductors or core wires of the cable can be stopped at the cable connector, reliability can be improved.

(8) Even if water enters into the connector structure through the cable insertion opening, electrical short-circuiting can be prevented.

(9) Since grounding of the cable earth line is not required to be performed in a small area within the motor but can be performed in the cable connector, operability is greatly improved.

(10) Erroneous connection easily can be avoided.

(11) It can easily be checked whether or not a liquid-tight seal is ensured.

What is claimed is:

1. Equipment comprising:
    a body to which electric power is supplied through a cable;
    said body having a first connector including a first insulation member, a support surface disposed around said first insulation member, and a first contact member supported by said first insulation member and connected to a lead wire of said equipment;
    said cable having at an end thereof a second connector including a cylindrical connector body having a first end secured to and sealed with an outer surface of said cable and a second end having a second insulation member supporting a second contact member connected to a core wire of said cable;
    said first and second contact members having complementary shapes to conductingly engage each other when said first and second connectors are connected; and
    said first connector having a cylindrical recess disposed between said first insulation member and said support surface, said second end of said cylindrical connector body having a cylindrical portion and a flange surrounding said cylindrical portion, said cylindrical portion fitting into said cylindrical recess and said flange being liquid-tightly sealed to said support surface when said first and second connectors are connected.

2. Equipment according to claim 1, wherein said second insulation member further supports an earth contact which is conductive to an earth core wire of said cable, said cylindrical connector body, said flange and said support surface are conductive, and said earth contact is conductive through said cylindrical connector body to said body.

3. Equipment according to claim 1, wherein said cylindrical portion of said second connector and said cylindrical recess of said first connector are contacted with each other before said first contact member and said second contact member are contacted with each other when said first and second connectors are connected with each other, and said cylindrical portion of said second connector and said cylindrical recess of said first connector are separated from each other before said first contact member and said second contact member are separated from each other when said first and second connectors are separated from each other.

4. Equipment according to claim 1, further comprising a shield between said second insulation member and said core wire to prevent penetration of water, and wherein said first insulation member includes a disk portion liquid-tightly sealed to a portion of said equipment body, and said second insulation member includes a disk portion liquid-tightly sealed to said second end of said cylindrical connector body.

5. Equipment comprising:
    a body to which electric power is supplied through a cable;
    said body having a first connector including a first insulation member, a support surface disposed around said first insulation member, and a first contact member supported by said first insulation member and connected to a lead wire of said equipment;
    said cable having at an end thereof a second connector including a cylindrical connector body having a first end secured to and sealed with an outer surface of said cable and a second end having a second insulation member supporting a second contact member connected to a core wire of said cable;
    said first and second contact members having complementary shapes to conductively engage each other when said first and second connectors are connected;
    said first connector further including a socket member having a flange portion having an upper surface defining said support surface, a socket cylindrical portion projecting below said flange portion and a cylindrical recess formed adjacent to an inner peripheral surface of said flange portion, an outer periphery surface of said socket cylindrical portion fitting into an opening of a top plate of said equipment body, and a bottom surface of said flange portion being supported by said top plate of said equipment body;
    said second end of said cylindrical connector body having a cylindrical portion extending into said cylindrical recess and a flange disposed outwardly of said cylindrical portion;
    said second end of said cylindrical connector body being connectable in a liquid-tight manner to said support surface when said first and second connectors are connected; and
    said socket member having therein a radial air passage normally closed by a plug, said air passage defining means to enable testing of whether or not a liquid-tight seal is ensured at a first seal ring between said flange of said second end of said cylindrical connector body and said support surface and at a second seal ring between said cylindrical portion of said second end of said cylindrical connector body and said cylindrical recess.

6. Equipment according to claim 5, comprising plural said first and second contact members, and wherein said flange portion of said socket member of said first connected and said flange of said second end of said cylindrical connector body of said second connector are connectable by fasteners and have a similar triangular outer configuration, the number of said fasteners being different from that of said first contact members.

7. Equipment according to claim 5, further comprising a shield between said second insulation member and said core wire to prevent penetration of water, and wherein said first insulation member includes a disk portion liquid-tightly sealed to a portion of said equipment body, and said second insulation member includes a disk portion liquid-tightly sealed to said second end of said cylindrical connector body.

8. An underwater motor comprising:
    a motor body to which electric power is supplied through a cable;
    said motor body having a first connector including a first insulation member and a support surface disposed around said first insulation member, and a first contact member supported by said first insulation member and connected to a lead wire of said underwater motor;
    said cable having at an end thereof a second connector including a cylindrical connector body having a first end secured to and sealed with an outer surface of said cable and a second end having a second insulation member supporting a second contact member connected to a core wire of said cable;
    said first and second contact members having complementary shapes to conductively engage each other when said first and second connectors are connected;
    said first connector having a cylindrical recess disposed between said first insulation member and said support surface, said second end of said cylindrical connector body having a cylindrical portion and a flange surrounding said cylindrical portion, said cylindrical portion fitting into said cylindrical recess and said flange being liquid-tightly sealed to said support surface when said first and second connectors are connected; and said second insulation member further supporting an earth contact which is conductive to an earth core wire of said cable, said cylindrical connector body, said flange and said support surface being conductive, and said earth contact being conductive to said cylindrical connector body.

9. An underwater motor according to claim 8, wherein said cylindrical portion of said second connector and said cylindrical recess of said first connector are contacted with each other before said first contact member and said second contact member are contacted with each other when said first and second connectors are connected with each other, and said cylindrical portion of said second connector and said cylindrical recess of said first connector are separated from each other before said first contact member and said second contact member are separated from each other when said first and second connectors are separated from each other.

10. An underwater motor according to claim 8, wherein said first connector further includes a socket member having a flange portion having an upper surface defining said support surface, and a socket cylindrical portion projecting below said flange portion, a cylindrical recess being formed adjacent to an inner peripheral surface of said flange portion to receive said cylindrical portion of said second end of said cylindrical connector body, an outer peripheral surface of said socket cylindrical portion fitting into an opening of a top plate of said underwater motor body, and a bottom surface of said flange portion being supported by said top plate of said underwater motor body, said socket member having therein a radial air passage normally closed by a plug, said air passage defining means to enable testing of whether or not a liquid-tight seal is ensured at a first seal ring between said flange of said second end of said cylindrical connector body and said support surface and at a second seal ring between said cylindrical portion of said second end of said cylindrical connector body and said cylindrical recess.

11. An underwater motor according to claim 10, comprising plural said first and second contact members, and wherein said flange portion of said socket member of said first connector and said flange of said second end of said cylindrical connector body of said second connector are connectable by fasteners and have a similar triangular outer configuration, the number of said fasteners being different from that of said first contact members.

12. An underwater motor according to claim 8, further comprising a shield between said second insulation member and said core wire to prevent penetration of water, and wherein said first insulation member includes a disk portion liquid-tightly sealed to a portion of said underwater motor body, and said second insulation member includes a disk portion liquid-tightly sealed to said second end of said cylindrical connector body.

* * * * *

UNITED STATES PATENT AND TRADEMARK OFFICE
CERTIFICATE OF CORRECTION

PATENT NO.   : 5,801,465
DATED        : September 1, 1998
INVENTOR(S)  : Yoshiyuki YAMADA et al.

It is certified that error appears in the above-indentified patent and that said Letters Patent is hereby corrected as shown below:

On the Abstract page, insert the following information between [22] and [51]

--[30]   Foreign Application Priority Data

July 3, 1995   [JP]   Japan   ......... 7-189788

April 8, 1996  [JP]   Japan   ......... 8-111276 --

Signed and Sealed this

Fourth Day of May, 1999

*Attest:*

Q. TODD DICKINSON

*Attesting Officer*      *Acting Commissioner of Patents and Trademarks*